United States Patent
Caplis et al.

(10) Patent No.: US 9,128,782 B2
(45) Date of Patent: *Sep. 8, 2015

(54) CONSOLIDATED DATA SERVICES APPARATUS AND METHOD

(71) Applicant: TYMPHANY HONG KONG LIMITED, Wanchai (HK)

(72) Inventors: Timothy J. Caplis, Encinitas, CA (US); Vincenzo O. Giuliani, Encinitas, CA (US); Anders C. Lokke Brogestam, Baulkham Hills (AU); Peter Celinski, Los Gatos, CA (US)

(73) Assignee: Tymphany Hong Kong Limited, Wanchai (HK)

( * ) Notice: Subject to any disclaimer, the term of this patent is extended or adjusted under 35 U.S.C. 154(b) by 0 days.

This patent is subject to a terminal disclaimer.

(21) Appl. No.: 14/066,646

(22) Filed: Oct. 29, 2013

(65) Prior Publication Data
US 2014/0059572 A1    Feb. 27, 2014

Related U.S. Application Data

(63) Continuation of application No. 13/345,306, filed on Jan. 6, 2012, now Pat. No. 8,572,685.

(51) Int. Cl.
*H04L 9/32* (2006.01)
*G06F 9/54* (2006.01)
*H04L 29/08* (2006.01)

(52) U.S. Cl.
CPC . *G06F 9/54* (2013.01); *H04L 67/28* (2013.01)

(58) Field of Classification Search
CPC ... H04L 9/3247; H04L 9/3236; H04L 9/3239; H04L 9/3242; H04L 63/20; H04L 63/08; H04L 63/0807; H04L 63/0838; H04L 63/083; H04L 63/123; H04L 67/28; G06F 9/54
USPC ............ 726/1–10, 26–30; 713/154–156, 165, 713/167–170, 176, 193
See application file for complete search history.

(56) References Cited

U.S. PATENT DOCUMENTS 7,206,791 B2    4/2007    Hind et al.
7,581,099 B2 *  8/2009    Ong .............................. 713/170
(Continued)

OTHER PUBLICATIONS

European Patent Office; International Search Report and Written Opinion; PCT Application No. PCT/US2013/020323; Feb. 21, 2013.

*Primary Examiner* — Hosuk Song
(74) *Attorney, Agent, or Firm* — Peter A. Nieves; Sheehan Phinney Bass + Green PA

(57) ABSTRACT

An apparatus for consolidated data services comprising a plurality of devices, a plurality of data services and a content application programming interface (API). A user API provides user identification for each of the plurality of devices using one or more of a plurality of user API methods. A feedback API configured to receive data from each of the plurality of devices that identifies media content that was delivered to the plurality of devices using one or more of a plurality of feedback API methods. A device API configured to provide a client system to one or more of the plurality of devices using one or more of a plurality of device API methods. A web service consolidator coupled to the content API, the user API, the feedback API, the device API, the update API, a plurality of data services and the plurality of devices through the communications media.

20 Claims, 3 Drawing Sheets

(56) References Cited

U.S. PATENT DOCUMENTS

| | | | |
|---|---|---|---|
| 7,841,000 B2 * | 11/2010 | Kawano et al. | 726/18 |
| 8,364,968 B2 | 1/2013 | Corcoran et al. | |
| 8,572,685 B2 * | 10/2013 | Caplis et al. | 726/2 |
| 8,850,558 B2 * | 9/2014 | Ong | 726/18 |
| 2009/0205030 A1 | 8/2009 | Ong | |
| 2011/0093535 A1 | 4/2011 | Takakura et al. | |

* cited by examiner

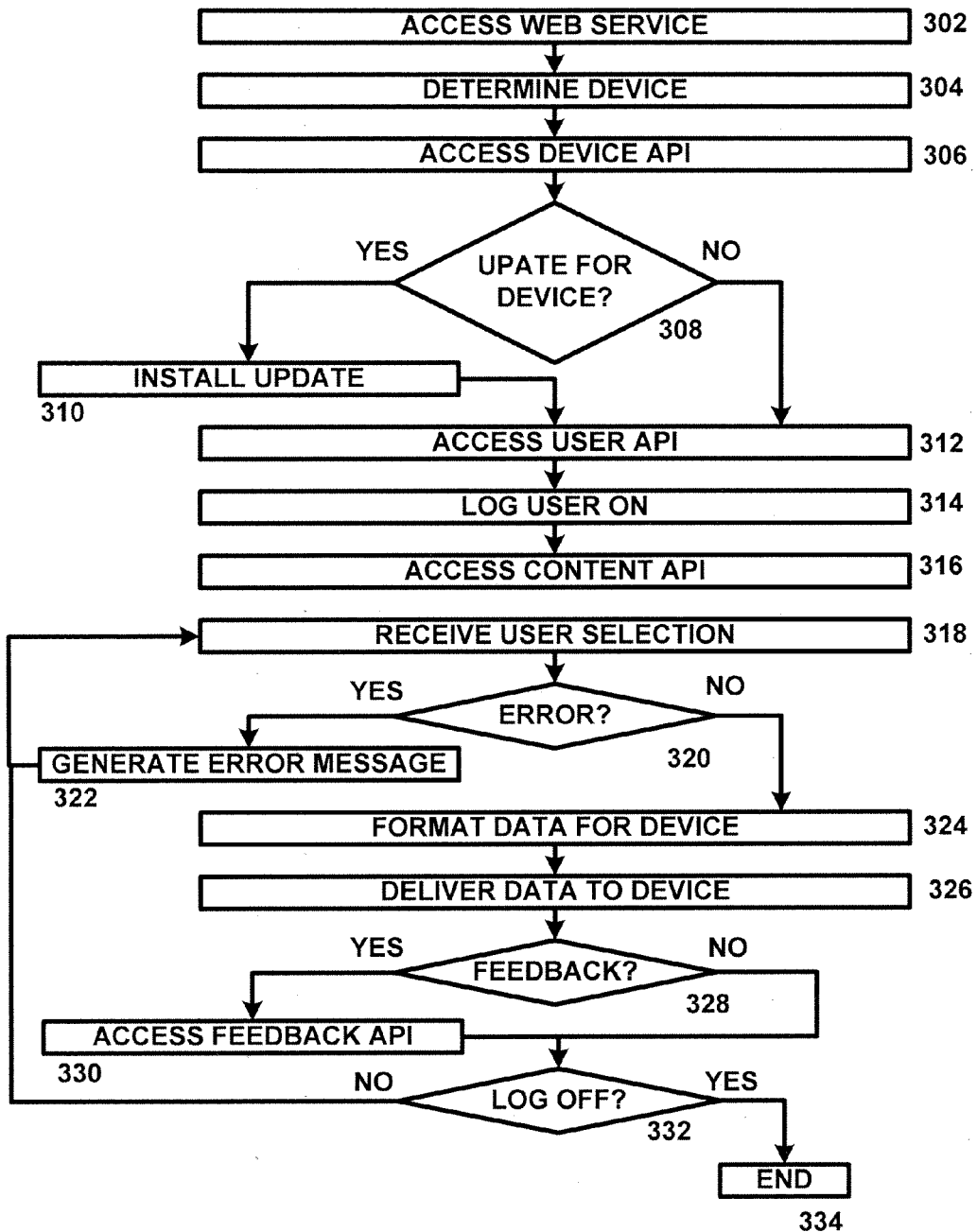
FIGURE 3    300

CONSOLIDATED DATA SERVICES APPARATUS AND METHOD

CROSS-REFERENCE TO RELATED APPLICATION

The present application is a continuation of U.S. Ser. No. 13/345,306, filed Jan. 6, 2012, now U.S. Pat. No. 8,572,685 which is hereby incorporated by reference for all purposes.

TECHNICAL FIELD

The present disclosure relates to data services, and more particularly to a web services apparatus and method that allows diverse web services to be consolidated through a common web services platform.

BACKGROUND OF THE INVENTION

The Internet is commonly used to provide access to data services providers. The ease for establishing a connection with a data service provider over the Internet has resulted in data service providers having dedicated service portals. However, because of the large number of different data service providers, data service users have to become proficient in using the interface for each different data service provider, which leads to mistakes and errors. In addition, peripherals and equipment must be configured to interface with different data services, which also leads to mistakes and errors.

SUMMARY OF THE INVENTION

An apparatus for consolidated data services comprising a plurality of devices, a plurality of data services and a content application programming interface (API). A user API provides user identification for each of the plurality of devices using one or more of a plurality of user API methods, wherein each of the user API methods includes a required signature parameter. A feedback API configured to receive data from each of the plurality of devices that identifies media content that was delivered to the plurality of devices using one or more of a plurality of feedback API methods. A device API configured to provide a client system to one or more of the plurality of devices using one or more of a plurality of device API methods. An update API configured to provide an updated client system to one or more of the plurality of devices using one more of a plurality of update API methods. A web service consolidator coupled to the content API, the user API, the feedback API, the device API, the update API, a plurality of data services and the plurality of devices through the communications media, the web service consolidator configured to control interactions between the content API, the user API, the feedback API, the device API, the update API, a plurality of data services and the plurality of devices.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

BRIEF DESCRIPTION OF THE SEVERAL VIEWS OF THE DRAWINGS

Aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views, and in which:

FIG. 3 is a diagram of an algorithm for providing consolidated data service delivery for a user device in accordance with an exemplary embodiment of the present disclosure.

DETAILED DESCRIPTION OF THE INVENTION

Figure 1:
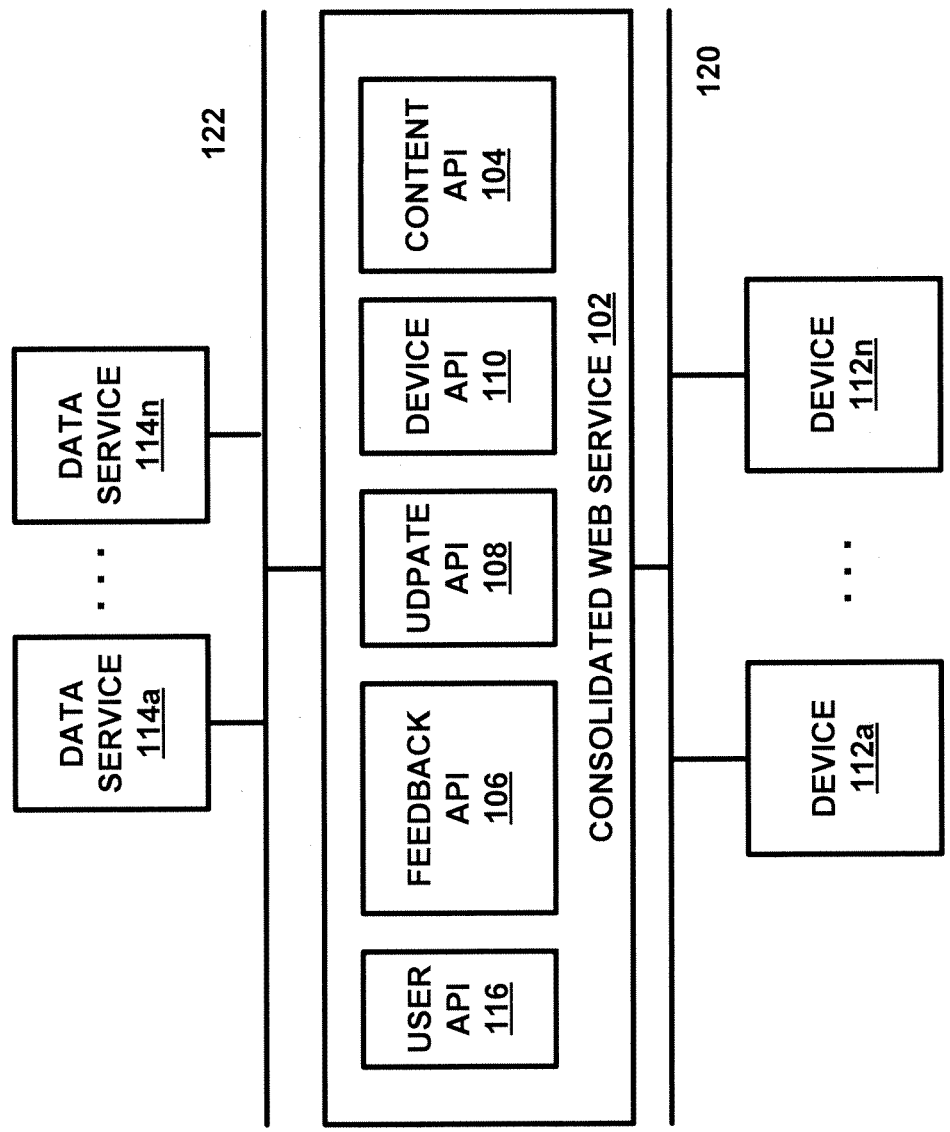
FIG. 1 is a diagram of a system for a consolidated data service apparatus and method that allow diverse data services, such as music data services, photo data services, video data services and social networking data services, to be provided using common application programming interfaces (APIs)

In the description that follows, like parts are marked throughout the specification and drawings with the same reference numerals. The drawing figures might not be to scale and certain components can be shown in generalized or schematic form and identified by commercial designations in the interest of clarity and conciseness.

FIG. 1 is a diagram of a system 100 for a consolidated data service apparatus and method that allow diverse data services, such as music data services, photo data services, video data services and social networking data services, to be provided using common application programming interfaces (APIs). System 100 can be implemented in hardware or a suitable combination of hardware and software, and can be one or more APIs operating on general and special purpose processing platforms, such as personal computers, tablet computers, telephones, televisions, stereo systems, or other suitable systems.

As used herein, "hardware" can include a combination of discrete components, an integrated circuit, an application specific integrated circuit, a field programmable gate array, or other suitable hardware. As used herein, "software" can include one or more objects, agents, threads, lines of code, subroutines, separate software applications, two or more lines of code or other suitable software structures operating in two or more software applications or on two or more processors, or other suitable software structures. In one exemplary embodiment, software can include one or more lines of code or other suitable software structures operating in a general purpose software application, such as an operating system, and one or more lines of code or other suitable software structures operating in a specific purpose software application. As used herein, the term "coupled" and its cognate terms such as "couples" or "couple," can include a physical connection (such as a wire, optical fiber, or a telecommunications medium), a virtual connection (such as through randomly assigned memory locations of a data memory device or a hypertext transfer protocol (HTTP) link), a logical connection (such as through one or more semiconductor devices in an integrated circuit), or other suitable connections. In one exemplary embodiment, a communications medium can be a network or other suitable communications media.

System 100 includes consolidated web service 102, which coordinates user API 116, content API 104, feedback API 106, update API 108 and device API 110, and which interfaces with devices 112a through 112n through communications media 120, and with data services 114a through 114n through communications media 122. Communications media 120 and 122 can separate communications media such as dedicated high-speed data connections, or can the same communications media or combinations of communications media, and can be a wire line communications medium or media such as the public switched telephone system or Internet, a wireless communications medium or media, an optical communications medium or media, a digital or analog communications medium or media, or a suitable combination of these or other communications media.

Consolidated web service 102 can include a request handler, an interface manager, a database abstraction layer, a database (such as for service data, user data, history data, update data, device data or other suitable data), content service mapping and other suitable functionality. In one exemplary embodiment, the request handler can receive requests from user devices and can manage responses to the requests (such as to track individual requests and addresses associated with the device that generated the requests). The interface manager can control access to user API 116, content API 104, feedback API 106, update API 108 and device API 110 that may be required to respond to request received from the user devices. The database abstraction layer can control access to the database, such as to prevent user data from being accessed by unauthorized personnel.

Content API 104 can interface with devices 112a through 112n and data services 114a through 114n through consolidated web service 102, or can also or alternatively be implemented as a plurality of dedicated content APIs that each interface with consolidated web service 102, devices 112a through 112n and one or more of data services 114a through 114n. This architecture minimizes the need for data services 114a through 114n to have customized software or algorithms for operation within system 100.

In one exemplary embodiment, a device 112a can interface with any of data services 114a through 114n through consolidated web service 102, user API 116, content API 104, feedback API 106 and update API 108. In this exemplary embodiment, a device having a user interface, such as a tablet computer, can access a data service such as an audio data service provider or video data service provider, using a single interface. As described in greater detail herein, a user can log onto an account hosted by consolidated web service 102 using their tablet computer, can receive a user interface that is optimized for the tablet computer, can select a type of data for delivery to the tablet computer, and can receive that data in a format that can be displayed on the tablet computer.

Devices 112a through 112n can include a client application that provides a client controller API, a consolidated web services controller interface, a consolidated web services query library and other suitable client functionality. In one exemplary embodiment, the client application can be obtained from a website (for a personal computer), from a smart phone or tablet application store, or from other suitable locations. In another exemplary embodiment, the consolidated web services query library can be a C++ library to consume the web services (communication layer), and the consolidated web services controller interface can be the data abstraction of the consolidated web services controller responses for the client controller API.

In another exemplary embodiment, a user can log onto an account hosted by web service provider 102 using a smart phone and can receive a user interface that allows the user to select a different device, such as stand alone speakers or a television set, to receive the selected data from the selected data service. In this exemplary embodiment, the user can select a sound recording to be delivered to a stand alone speakers, a video recording to be delivered to a television set, or other suitable data (text, images) to be delivered to other suitable devices (printers, copiers, fax machines). In this manner, system 100 allows a device such as a smart phone, personal computer or tablet computer to operate as a universal remote control device for a plurality of diverse devices, such as speakers, stereo systems, televisions, printers, fax machines or copiers.

Figure 2:
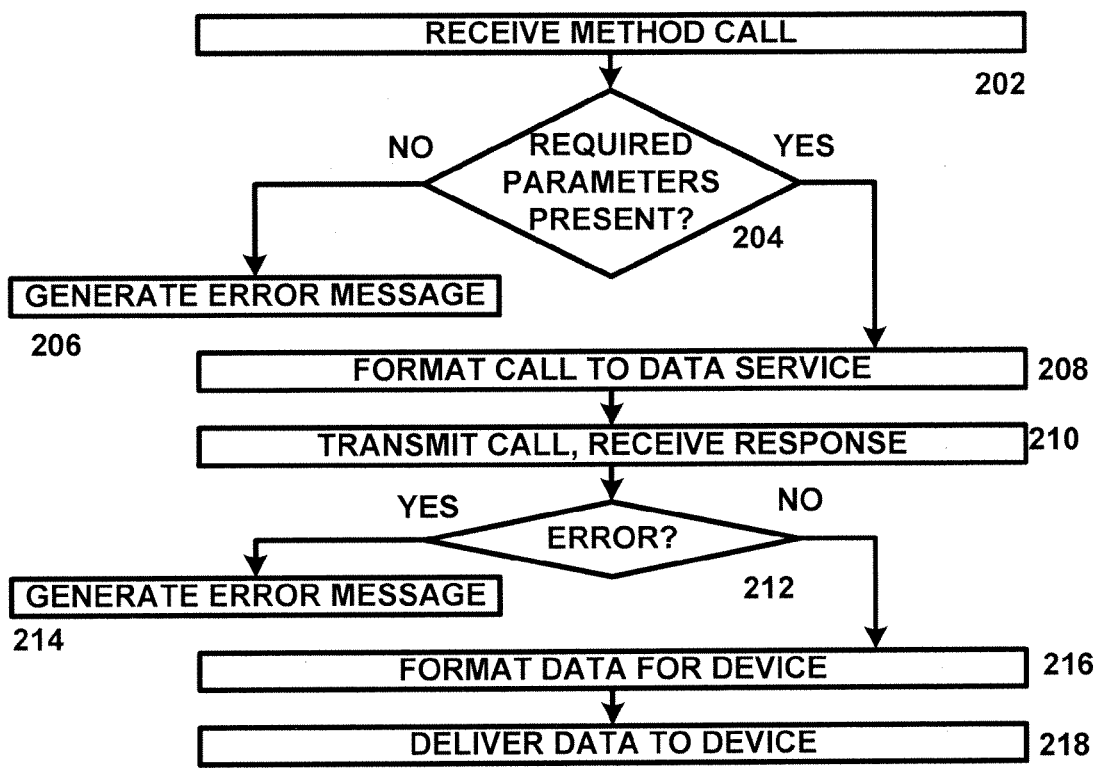
FIG. 2 is a diagram of an algorithm for providing consolidated data service delivery in accordance with an exemplary embodiment of the present disclosure.

FIG. 2 is a diagram of an algorithm 200 for providing consolidated data service delivery in accordance with an exemplary embodiment of the present disclosure. Algorithm 200 is an exemplary algorithm having disclosed data entry states, data processing states, and data output states, where one or more processing platforms operate under software control to perform to perform the disclosed algorithmic functions.

Algorithm 200 begins at 202, where a method call is received. As discussed in greater detail herein, the method call can include data in a predetermined data format having required data fields and optional data fields. By utilizing the architecture of system 100, the different APIs can utilize method calls that have common data fields that can be readily translated for use by other APIs and other method calls, so as to provide the disclosed interoperability. The algorithm then proceeds to 204.

At 204, it is determined whether required data fields for the method call are present. As disclosed in greater detail herein, each method call can have one or more predetermined required data fields, such that if a required data field is not present, then the method call is incomplete. The required data fields for a method call can be determined by looking up an associated data table or other suitable data structures associated with the identifier for the method call, which can be included in a predetermined location within the method call data format. If it is determined at 204 that a required parameter is not present, the algorithm proceeds to 206 where a suitable error message is generated. In one exemplary embodiment, the error message can generate a user display that requests additional information, a selection (such as a device selection or a data service selection), or other suitable information. In another exemplary embodiment, the error message can be a query to consolidated web service 102, user API 116, content API 104, feedback API 106, update API 108 or other suitable systems or devices, where the response to the query can provide the missing parameter, or other suitable processes can also or alternatively be used.

If it is determined at 204 that all required parameters are present, the algorithm proceeds to 208 where a call to a data service is formatted, such as using content API 104. In another exemplary embodiment, a call to user API 116, content API 104, feedback API 106, update API 108 or other suitable systems or devices can be generated, such as where a user is configuring their system or selection choices, or other suitable functions can also or alternatively be implemented. The algorithm then proceeds to 210.

At 210, a call is transmitted to the data service and the response to the call is received. In one exemplary embodiment, the call can include a request for a specific type of data (audio program, video program), a list of content (a list of artists or programs), or other suitable data. The algorithm then proceeds to 212, where it is determined whether the response included an error message. In one exemplary embodiment, the error message can indicate that the data service is unavailable, that the user does not have authorization for the requested content, or other suitable error messages. If it is determined that an error message has been received, the algorithm proceeds to 214 where a suitable error message is generated. In one exemplary embodiment, the error message can generate a user display that requests additional information, a selection (such as a new program selection or a new device destination), or other suitable information. In another exemplary embodiment, the error message can be a query to consolidated web service 102, user API 116, content API 104, feedback API 106, update API 108 or other suitable systems or devices, where the response to the query can provide the missing parameter, or other suitable processes can also or alternatively be used. Otherwise, the algorithm proceeds to 216.

At 216, data is formatted for delivery to a device. In one exemplary embodiment, the data can include a user interface, where the data is formatted to be used in a user interface template. In another exemplary embodiment, the data can include audio data, video data, image data, text data or other suitable data that is formatted for delivery to a speaker, a television, the display of a personal computer or tablet computer, or other suitable device. The algorithm then proceeds to 218, where the data is delivered to the device.

In operation, algorithm 200 allows diverse data services and devices to interface through a common platform that includes consolidated web service 102, user API 116, content API 104, feedback API 106 and update API 108. Algorithm 200 can also or alternatively be implemented using object-oriented programming, where the different states disclosed above and in further detail below are related based on object-oriented principles. The various APIs and associated methods described below can be used within the architecture of system 100 and with algorithm 200 to provide the functionality discussed herein. In that regard, the discussion of the APIs and associated methods that follows can be applied to system 100 and algorithm 200, as well as to other suitable systems and algorithms.

FIG. 3 is a diagram of an algorithm 300 for providing consolidated data service delivery for a user device in accordance with an exemplary embodiment of the present disclosure. Algorithm 300 is an exemplary algorithm having disclosed data entry states, data processing states, and data output states, where one or more processing platforms operate under software control to perform to perform the disclosed algorithmic functions.

Algorithm 300 begins at 302, where a consolidated web service is access from a user device. In one exemplary embodiment, the user device may have an installed client system that operates to provide access to the consolidated web service. In another exemplary embodiment, the user device can access a web site or other resource and can receive initial configuration for accessing the consolidated web service. Other suitable processes can also or alternatively be used, such as those described in greater detail herein. The algorithm then proceeds to 304.

At 304, the device is determined. In one exemplary embodiment, the device can be determined using a suitable method as disclosed herein from a machine id, such as where the device has an existing client system. In another exemplary embodiment, the device can be determined by querying the device or user for device type data. In yet another exemplary embodiment, the device can be determined for a peripheral that is accessed from a user interface device. Other suitable methods or processes can also or alternatively be used. The algorithm then proceeds to 306.

At 306, a device API is accessed. In one exemplary embodiment, the device API can be device API 110 or other suitable device APIs. The algorithm then proceeds to 308.

At 308, it is determined whether an update for the device is available, needs to be installed, has been requested, or otherwise needs to be accessed. In one exemplary embodiment, device API 110 methods can be executed. If it is determined that an update for the device exists, the algorithm proceeds to 310, where the update is installed. In one exemplary embodiment, an update API 108 method can be used to update the device or to perform other suitable functions as disclosed herein. The algorithm then proceeds to 312. Likewise, if it is determined at 308 that no device update is available or required, the algorithm proceeds to 312.

At 312, a use API is accessed. In one exemplary embodiment, user API 116 can be accessed, such as to authenticate a user or to perform other suitable user API 116 methods as disclosed herein. The algorithm then proceeds to 314.

At 314, the user logs on to the consolidated web service. In one exemplary embodiment, a user authentication or logon method of user API 116 can be implemented as disclosed herein. The algorithm then proceeds to 316.

At 316, a content API is accessed. In one exemplary embodiment, the content API can be content API 104 or other suitable content APIs, and one or more content API 104 methods as disclosed herein can be implemented. The algorithm then proceeds to 318.

At 318, a user selection is received. In one exemplary embodiment, the user selection can be a content selection, such as by using one or more of the content API 104 methods as disclosed herein or other suitable user selections. The algorithm then proceeds to 320.

At 320, it is determined whether an error has been generated. In one exemplary embodiment, the error can be one of the errors disclosed herein that are generated in response to the content selection, such as by the content service, the content API, or other suitable systems. If it is determined that an error has been generated, the algorithm proceeds to 322, where an error message is generated. In one exemplary embodiment, the error message can be generated for display on the user device, for review by an operator of system 100, or other suitable error messages can be generated. The algorithm then returns to 318, terminates, or other suitable methods as disclosed herein or procedures can be used.

If it is determined at 320 that no error has been generated, the algorithm proceeds to 324, where data is formatted for the device. In one exemplary embodiment, content data can be formatted for delivery to the user device, such as by the content service. In other exemplary embodiments, content data can be formatted for delivery to a peripheral device, data for a user interface display can be generated, or other suitable data can be formatted that is responsive to the user selection. The algorithm then proceeds to 326.

At 326, data is delivered to the device. In one exemplary embodiment, the data can include audio or video content such as sound recordings, movies, television shows or other suitable audio or video content. In another exemplary embodiment, the data can include text data, image data, telephone message, facsimile transmissions, print jobs or other suitable data. The algorithm then proceeds to 328.

At 328, it is determined whether feedback is required or has been generated. In one exemplary embodiment, feedback can include information about audio or video content that has been delivered. In another exemplary embodiment, feedback can include user entered feedback or other suitable data. If it is determined that feedback is required or has been generated, the algorithm proceeds to 330 where a feedback API is accessed. In one exemplary embodiment, feedback API 106 can be used to implement an associated method as disclosed herein, or other suitable feedback API methods or processes can be implemented. The algorithm then proceeds to 332. Likewise, if it is determined at 328 that feedback has not been generated or is not required, the algorithm proceeds to 332.

At 332, it is determined whether the user has logged off, such as by selecting a logoff command or control, by timing out, or in other suitable manners. If the user has logged off, the algorithm proceeds to 334, otherwise, the algorithm returns to 318 or other suitable states.

In operation, algorithm 300 allows diverse data services and devices to interface through a common platform that includes consolidated web service 102, user API 116, content API 104, feedback API 106 and update API 108. Algorithm 300 can also or alternatively be implemented using object-oriented programming, where the different states disclosed above and in further detail below are related based on object-oriented principles. The various APIs and associated methods described below can be used within the architecture of system 100 and with algorithm 300 to provide the functionality discussed herein. In that regard, the discussion of the APIs and associated methods that follows can be applied to system 100 and algorithm 300, as well as to other suitable systems and algorithms.

Content providers have varying functions, parameters, return types and processes for communicating with other systems, such as Simple Object Access Protocol (SOAP), eXtensible Markup Language Remote Procedure Call (XML RPC) and JavaScript Object Notation Remote Procedure Call (JSON RPC), and Relative Expression Software Tool (REST). In addition, content providers have varying methods of authenticating users that further complicate web service implementation. Content API 104 provides a uniform interface to these different protocols.

In one exemplary embodiment, content API 104 can allow a call to be executed across different data services 114a through 114n in a uniform fashion by using proxy calls through a content API REST Interface. REST is an architectural style developed alongside HTTP, and can be utilized for client-server communication rather than building a layer on top of client-server communications, such as SOAP or XML-RPC. Other suitable interfaces can also or alternatively be utilized.

Web service calls can vary between content providers, and a call from one web service may have no basis for a call in another, or simply may not exist. For example, a web service call to retrieve a list of top tracks would not make sense for a content provider that specializes in photos. For this reason, such a call would result in a mapping error that could be handled appropriately. In situations where content providers offer similar services, the mapping error might not be apparent. The error system employed by content API 104 allows non existent calls to be properly handled, in addition to providing a means for investigating a content provider's web service.

Content API Methods.

The following sections describe content API 104 methods and parameters. Due to the open ended nature of content API 104, the responses from calls depend more on parameters passed than on the method invoked. Below is a description of methods for content API 104 and each method's available parameters. While some parameters are always required, such as partner key, the intention of the request will determine which parameters are used and will vary from call to call.

| Method | Description | Parameters |
| --- | --- | --- |
| get | Retrieve an item or a list of items. | service, type, id, name, filter, context type, content id, context name, language, country, key, signature, format, machine id |
| search | Search for an item. | service, type, name, language, country, key, format, machine id |
| add | Add an item. | service, type, id, context name, language, country, key, format, machine id |
| update | Update an item. | service, type, id, context name, language, country, key, format, machine id |
| remove | Remove an item. | service, type, id, context name, language, country, key, format, machine id |

The parameters for content API 104 can have the following characteristics.

| Parameter | Requirement | Description |
| --- | --- | --- |
| Service | required | The service to query. |
| type | required | The type requested, such as: album; artist; bookmark; comment; genre; image; link; list; location; mixed; photo; service; show; station; status; stream; tag; track; user; video. |
| id | not required | The id of an item. |
| name | not required | The name of an item. |
| filter | not required | The filter to apply to the query, such as: top; added; new; exclusive; popular; hot; buzz; favorite; picks; library; gallery; similar; schedule; discover; friends; parent; child; key; history; report; follower; following; featured; rated |
| Context type | not required | The context type. Defines the context of a query. For example to retrieve albums for an artist, the artist is the context type. |
| Context id | not required | The context id. Defines the context of a query. For example to retrieve albums for an artist, the artist id or name |
| Context name | not required | The context name. Defines the context of a query. For example to retrieve albums for an artist, the artist name is the context name. |
| start | not required | The start index for paging. |
| count | not required | The number of items to retrieve from beginning at 'start'. |
| language | not required | The language to use for the query. |
| country | not required | The country to use for the query. |
| key | required | The key used to identify the partner developer. |
| signature | required only for authenticated calls | A secure has algorithm (SHA1) hash of the concatenation of method, parameters ordered by key followed by the value, partner developer secret and session key. |
| format | not required | The response format, 'xml' or 'json'. Default is 'xml'. |
| Machine id | not required | The machine id. |
| value | not required | Used to set the value of a type, for example a rating, tag, comment. |
| ac | not required | This is used for services that have auto complete search capability. |

User API Methods.

User API 116 allows a partner developer to create and manage profiles on behalf of the user. In addition to storing general information about the user, the user profile manages multiple content provider credentials by employing a key-chain model. User API 116 is used for accessing content provider user data such as a user's music library, playlists, favorites, friends or other suitable data.

Sharing and bookmarking can also be provided by User API 116. Users can be allowed to create bookmarks and playlists to access relevant content quickly and to share content. Unlike content API 104, which can be open ended to accommodate various content providers, user API 116 can expose methods and parameters more like a traditional web service.

Signatures can be used for user API 116 calls and calls that use a session key. A signature can be created without a session key (e.g. SHA1 (method+ordered parameters+partner secret) or with a session key (e.g. SHA1 (method+ordered parameters+partner secret+session key). The SHA1 output can be converted to hexadecimal format. The method used can be the call method, for example "get" from content API 104 or "login" from user API 116. Ordered parameters can be a concatenation of each parameter ordered by parameter key name followed by the parameter value.

The partner secret can be the private token given to a partner when the partner key is received. The session key can be the token returned from a user authentication call such as register, login, get session and create session. The session key can be added to the signature when it is needed to perform a call. The query library can automatically create and add a signature to the query.

In one exemplary embodiment, four user API 116 methods can be used to return a session: 1) register; 2) login; 3) session; 4) session add. The session key can be a unique token that identifies the user when making calls to the web service. The session key can expire after a predetermined amount of time. In addition to the session key, a coordinated universal time (UTC) timestamp can be returned that marks the session expiration. When the session has expired, it will no longer be valid and a call must be made to retrieve a new session. This call can be performed without prompting the user to login again, assuming the application has properly stored the user's web service username and authorization token. The authorization token can be a SHA1 hash of the user's web service password, which can be captured when the user performs a login. The application does not need to store a plaintext password, as none of the functions require it apart from registration.

Below are descriptions of exemplary user API 116 methods. Some user API 116 methods require https in this exemplary embodiment, and will result in an error response if not secure. Other suitable embodiments that do not require https can also or alternatively be used.

The "register" method registers a user. On success, a new user will be returned with a new session. Otherwise, an appropriate error is returned. The HTTP Method for "register" is POST, and "register" requires https. POST is a request method supported by the HTTP protocol used by the World Wide Web, and can be used when the client needs to send data to the server as part of the request, such as when uploading a file or submitting a completed form. In contrast to the GET request method where only a URL and headers are sent to the server, POST requests also include a message body. This allows for arbitrary length data of any type to be sent to the server. The parameters are:

| Name | Required | Description | Details |
|---|---|---|---|
| username | yes | The user's username. | Can be a predetermined number of characters in length, not case sensitive, and can consist of alphanumeric characters and special symbols. |
| password | yes | The user's plaintext password. | Can be a predetermined number of characters in length, can contain at least one digit and uppercase letter, can contain punctuation. |
| Email | yes | The user's email address. | Can be a valid email address. |
| First name | yes | The user's first name. | |
| Last name | yes | The user's last name. | |
| address | no | The user's address. | |
| City | no | The user's city. | |
| State | no | The user's state. | |
| Zip code | no | The user's zip code. | |
| Area code | no | The user's area code. | |
| Phone | no | The user's phone number. | |
| Language | no | The user's language. | Can default to "en" if not set. |
| country | no | The user's country. | Can default to "us" if not set. |
| key | yes | The partner key. | |
| signature | yes | A signature for this call. | |

The "login" method is used to login a user. On success, login can return a user with the current valid session or a new session if the user's current session has expired. Otherwise, login can return an appropriate error. All pertinent user data can be returned by this call. The HTTP method for "login" is GET, and "login" requires https. The parameters are:

| Name | Required | Description |
|---|---|---|
| username | yes | The user's profile username. |
| auth | yes | The user's authorization token, such as an SHA1 hash of the user's password. |
| key | yes | The partner key. |
| signature | yes | A signature for this call. |

The "logout" method is used to logout a user, and removes the user's current session. The HTTP method for the "logout" method is GET, and the parameters are:

| Name | Required | Description |
|---|---|---|
| key | yes | The partner key. |
| signature | yes | A signature for this call. |

The "update" method updates a user's profile information. On success, update will return a user. Otherwise, update will return the appropriate error. The HTTP Method for "update" is POST, and "update requires https. The parameters are:

| Name | Required | Description | Details |
|---|---|---|---|
| email | no | The user's email address. | Can be a valid email address. |
| First name | no | The user's first name. | |
| Last name | no | The user's last name. | |
| address | no | The user's address. | |
| city | no | The user's city. | |
| state | no | The user's state. | |
| Zip code | no | The user's zip code. | |
| Area code | no | The user's area code. | |
| phone | no | The user's phone number. | |
| lang | no | The user's language. | Can default to "en" if not set. |
| country | no | The user's country. | Can default to "us" if not set. |
| key | yes | The partner key. | |
| signature | yes | A signature for this call. | |

The "password update" method can update a user's password. On success, returns status OK. On fail returns status FAIL. The HTTP Method is POST, and the "password update" method can require https. The parameters are:

| Name | Required | Description | Details |
|---|---|---|---|
| auth | yes | The SHA1 of the user's current plaintext password. | |
| New password | yes | The user's new plaintext password. | Can be a predetermined number of characters, can contain at least one digit and uppercase letter. |
| key | yes | The partner key. | |
| signature | yes | A signature for this call. | |

The "password reset" method resets a user's password. An email message can be sent with a temporary password. The HTTP method is POST, and it requires https. The associated parameters are:

| Name | Required | Description |
|---|---|---|
| email | yes | The user's valid email. |
| key | yes | The partner key. |
| signature | yes | A signature for this call. |

The "exists" method checks to determine whether a username is already in use. The associated HTTP Method is GET, and the parameters are:

| Name | Required | Description |
|---|---|---|
| username | yes | A username to test. |
| key | yes | The partner key. |
| sig | yes | A signature for this call. |

The "session" method can retrieve a user session. On success, this method will return the current valid session or a new session if the user's current session has expired. Otherwise, the method will return the appropriate error. This method does not return user data. The HTTP Method used is GET, https is required, and the parameters are:

| Name | Required | Description |
|---|---|---|
| username | yes | The user's profile username. |
| auth | yes | The user's auth token, can be an SHA1 hash of the user's password. |
| key | yes | The partner key. |
| signature | yes | A signature for this call. |

The "session add" method creates a new user session. On success, this method will return a user with a new session. Otherwise, the method will return the appropriate error. This will overwrite the current session for this user even if the current session is valid. The HTTP Method is GET, https is required, and the parameters are:

| Name | Required | Description |
|---|---|---|
| username | yes | The user's profile username. |
| auth | yes | The user's auth token, an SHA1 hash of the user's password can be used. |
| key | yes | The partner key. |
| signature | yes | A signature for this call. |

The "services" method retrieves a user's content services. The HTTP Method used is GET, and the parameters are:

| Name | Required | Description |
|---|---|---|
| key | yes | The partner key. |
| signature | yes | A signature for this call. |

The "service add" method adds a content provider service. On success, a user is returned with an updated user services list. Otherwise, an appropriate error is returned. This method can be used where user authentication is specified by username and password. The HTTP Method is POST, https is required, and the parameters are:

| Name | Required | Description |
|---|---|---|
| service | Yes | The service to add. |
| service username | Yes | The user's service username. |
| service password | Yes | The user's service password. |
| service userid | No | The user's service id. |
| key | Yes | The partner key. |
| signature | Yes | A signature for this call. |

The "service add" method adds a content provider service. On success, a user is returned with an updated user services list. Otherwise, an appropriate error is returned. This method can be used where user authentication is specified. The HTTP Method is POST, https is required, and the parameters are:

| Name | Required | Description |
|---|---|---|
| service | Yes | The service to add. |
| oauth | Yes | This parameter can be set to 1. |
| service username | No | The user's service username. |
| service password | No | The user's service password. |
| key | Yes | The partner key. |
| signature | Yes | A signature for this call. |

The "service remove" method removes a content provider service. On success, a user is returned with an updated user services list. Otherwise, an appropriate error is returned. The HTTP Method is GET, and the parameters are:

| Name | Required | Description |
| --- | --- | --- |
| service | yes | The service to remove. |
| key | yes | The partner key. |
| signature | yes | A signature for this call. |

Users can share resources using a web service sharing mechanism. The "share" method can get bookmark share with another user, the HTTP Method is GET, and the parameters are:

| Name | Required | Description |
| --- | --- | --- |
| id | yes | The bookmark share id. |
| username | no | The username. |
| key | yes | The partner key. |
| signature | yes | A signature for this call. |

The "shares" method gets user's bookmark shares based on different criteria. The HTTP Method is GET, and the parameters are:

| Name | Required | Description |
| --- | --- | --- |
| username | no | The username to get shares from |
| user service | no | The service name |
| shared | no | This can be Boolean and set to 0 for shares shared by user (sent) and 1 for shares shared to user (received). |
| key | yes | The partner key. |
| signature | yes | A signature for this call. |

The "share add" method can add bookmark share with another user. The HTTP Method can be POST and the parameters are:

| Name | Required | Description |
| --- | --- | --- |
| username | yes | The web service username who to share to. |
| user service | yes | The user's service. |
| service | yes | The resource service. |
| type | yes | The resource type |
| id | no | The resource id, can be required if name or filter are not set. |
| name | no | The resource name, can be required if id or filter are not set. |
| filter | no | The resource filter, can be required if id or name are not set. |
| Context type | no | The resource context type |
| cid | no | The resource context id. |
| Context name | no | The resource context name. |
| key | yes | The partner key. |
| signature | yes | A signature for this call. |

The "share remove" method removes a bookmark share. The HTTP Method is GET and the parameters are:

| Name | Required | Description |
| --- | --- | --- |
| id | yes | The share id. |
| key | yes | The partner key. |
| signature | yes | A signature for this call. |

The "shares remove" method removes bookmark shares based on different criteria. The HTTP Method used is GET, and the parameters are:

| Name | Required | Description |
| --- | --- | --- |
| username | no | The username to remove shares from |
| User service | no | The service name. |
| shared | no | This can be Boolean and set to 0 for shares shared by user (sent) and 1 for shares shared to user (received). |
| key | yes | The partner key. |
| signature | yes | A signature for this call. |

The "bookmark" method can get a bookmark that is specified by id. The HTTP Method is GET and the parameters are:

| Name | Required | Description |
| --- | --- | --- |
| id | yes | Bookmark id |
| key | yes | The partner key. |
| signature | yes | A signature for this call. |

The "bookmarks" method returns all user's bookmarks. The HTTP Method is GET, and the parameters are:

| Name | Required | Description |
| --- | --- | --- |
| start | no | The start index. |
| count | no | The number of items to return from start index. |
| key | yes | The partner key. |
| signature | yes | A signature for this call. |

The "bookmark add" method adds a bookmark. The HTTP Method is POST and the parameters are:

| Name | Required | Description |
| --- | --- | --- |
| service | yes | The service origin. |
| type | yes | The content type. |
| id | no | The content id, can be required if name or filter are not set. |
| name | no | The content name, can be required if id or filter are not set. |
| filter | no | The content filter, can be required if id or name are not set. |
| Context type | no | The content context type. |
| Context id | no | The content context id. |
| Context name | no | The content context name. |
| key | yes | The partner key. |
| signature | yes | A signature for this call. |

The "bookmark remove" method is used to remove a bookmark specified by the id. The HTTP Method is GET, and the parameters are:

| Name | Required | Description |
| --- | --- | --- |
| id | yes | Bookmark id |
| key | yes | The partner key. |
| signature | yes | A signature for this call. |

The "bookmarks remove" method removes all user's bookmarks. The HTTP Method is GET and the parameters are:

| Name | Required | Description |
| --- | --- | --- |
| key | yes | The partner key. |
| signature | yes | A signature for this call. |

The "playlist" method is used to get a user's playlist specified by playlist id. The HTTP Method is GET and the parameters are:

| Name | Required | Description |
| --- | --- | --- |
| pid | yes | Playlist id |
| key | yes | The partner key. |
| signature | yes | A signature for this call. |

The "playlists" method gets all playlists for a user. The HTTP Method is GET and the parameters are:

| Name | Required | Description |
| --- | --- | --- |
| start | no | The start index (default is 0). |
| count | no | The number of playlists to return from start index (default is 10). |
| key | yes | The partner key. |
| Signature | yes | A signature for this call. |

The "playlist add" method adds a playlist. The HTTP Method is POST, and the parameters are:

| Name | Required | Description |
| --- | --- | --- |
| name | yes | The playlist name. |
| description | no | The playlist description. |
| key | yes | The partner key. |
| signature | yes | A signature for this call. |

The "playlist remove" method removes a user's playlist. The HTTP Method is GET, and the parameters are:

| Name | Required | Description |
| --- | --- | --- |
| pid | yes | The playlist id. |
| key | yes | The partner key. |
| signature | yes | A signature for this call. |

The "playlists remove" method removes all playlists for a user. The HTTP Method is GET, and the parameters are:

| Name | Required | Description |
| --- | --- | --- |
| key | yes | The partner key. |
| Signature | yes | A signature for this call. |

The "playlist update" method updates a user playlist. The HTTP Method is POST, and the parameters are:

| Name | Required | Description |
| --- | --- | --- |
| pid | yes | The playlist id. |
| name | no | The playlist name. |
| description | no | The playlist description. |
| order | no | A comma separated list of playlist resource ids, defining the order. |

-continued

| Name | Required | Description |
| --- | --- | --- |
| key | yes | The partner key. |
| signature | yes | A signature for this call. |

The "playlist resources" or "playlist tracks" methods are used to update a user playlist. The HTTP Method is POST, and the parameters are:

| Name | Required | Description |
| --- | --- | --- |
| pid | yes | The playlist id. |
| start | no | The start index. |
| count | no | The number of items to return from start index. |
| key | yes | The partner key. |
| signature | yes | A signature for this call. |

The "playlist resource add" or "playlist track add" methods are used to add a track resource to a playlist. The resource can be of type 'track'. The HTTP Method is POST, and the parameters are:

| Name | Required | Description |
| --- | --- | --- |
| pid | yes | The playlist id. |
| service | yes | The service origin. |
| type | yes | The content type, which can be set to track, albums, artists, or genres. |
| id | yes | The content id. |
| name | yes | The content name. |
| Context type | no | The content context type. |
| Context id | no | The content context id. |
| Context name | no | The content context name. |
| uri | no | The content uri, which can be used for local content such as an UPnP URI and can be URL encoded. |
| details | no | A serialized string of key/value pairs, which can be used for local content where extra UPnP metadata is needed such as media server name, media server id. |
| key | yes | The partner key. |
| signature | yes | A signature for this call. |

The "playlist resource remove" or "playlist track remove" methods can be used to remove a track resource from a playlist. The HTTP Method is GET, and the parameters are:

| Name | Required | Description |
| --- | --- | --- |
| playlist resource id | yes | The playlist resource id. |
| key | yes | The partner key. |
| sig | yes | A signature for this call. |

The "device add" method can be used to register a user's device. The parameters are:

| Name | Required | Description |
| --- | --- | --- |
| Machine id | yes | Unique machine id. |
| Model id | yes | The model id. |
| Current version | no | Installed device software version. |
| Key | yes | The partner key. |
| Signature | yes | A signature for this call. |

The "device" method is used to get required information for a user's device, such as a model. The parameters are:

| Name | Required | Description |
| --- | --- | --- |
| Machine id | yes | The user's device id. |
| Key | yes | The partner key. |
| signature | yes | A signature for this call. |

The "devices" method is used to get all registered user's devices. The parameters are:

| Name | Required | Description |
| --- | --- | --- |
| key | yes | The partner key. |
| signature | yes | A signature for this call. |

The "device update" method is used to update information for user's device. The parameters are:

| Name | Required | Description |
| --- | --- | --- |
| Machine id | yes | Machine id |
| version | yes | Installed device software version. |
| Key | yes | The partner key. |
| signature | yes | A signature for this call. |

The "device remove" method is used to unregister a user's device. The parameters are:

| Name | Required | Description |
| --- | --- | --- |
| Machine id | yes | The user's device id. |
| key | yes | The partner key. |
| signature | yes | A signature for this call. |

The "devices remove" method is used to unregister all of a user's devices. The parameters are:

| Name | Required | Description |
| --- | --- | --- |
| key | yes | The partner key. |
| signature | yes | A signature for this call. |

The "queue all" method is used to obtain a list of queues which the current user owns. The HTTP Method is GET and the associated parameters are:

| Name | Required | Description |
| --- | --- | --- |
| key | yes | The partner key. |
| signature | yes | A signature for this call. |

The "queue get" method is used to obtain queue metadata, such as for registered users and queue owner to see the metadata. The HTTP Method is GET and the associated parameters are:

| Name | Required | Description |
| --- | --- | --- |
| Queue id | yes | The queue id. |
| Key | yes | The partner key. |
| Signature | yes | A signature for this call. |

The "queue add" method registers a queue to the current user, who becomes the queue owner. The HTTP Method is GET and the associated parameters are:

| Name | Required | Description |
| --- | --- | --- |
| Machine id | yes | Unique machine id. |
| Name | no | The queue name. |
| description | no | The queue description. |
| key | yes | The partner key. |
| signature | yes | A signature for this call. |

The "queue update" method updates queue metadata. Either the name or description can be set. The HTTP Method is GET and the associated parameters are:

| Name | Required | Description |
| --- | --- | --- |
| Queue id | yes | The queue id |
| Name | no | The queue name. |
| Description | no | The queue description. |
| Key | yes | The partner key. |
| Signature | yes | A signature for this call. |

The "queue remove" method unregisters queue ownership for the current user. The HTTP Method is GET and the associated parameters are:

| Name | Required | Description |
| --- | --- | --- |
| Queue id | yes | The queue id |
| key | yes | The partner key. |
| signature | yes | A signature for this call. |

The "queue users" method provides a list of users registered to the queue, such as where registered users are permitted to make this call. The HTTP Method is GET and the associated parameters are:

| Name | Required | Description |
| --- | --- | --- |
| Queue id | yes | The queue id |
| Key | yes | The partner key. |
| Signature | yes | A signature for this call. |

The "queue user add" method registers users to the queue, such as where the queue owner is registered when the queue is registered, where the queue owner is permitted to make this call. The HTTP Method is GET and the associated parameters are:

| Name | Required | Description |
| --- | --- | --- |
| Queue id | yes | The queue id |
| username | yes | The user's username |
| Status | no | The user's status. |
| Key | yes | The partner key. |
| Signature | yes | A signature for this call. |

The "queue user update" method updates the queue user status, such as where the queue owner is permitted to make this call. The HTTP Method is GET and the associated parameters are:

| Name | Required | Description |
| --- | --- | --- |
| Queue id | yes | The queue id |
| username | yes | The user's username |
| Status | yes | The user's status. |
| Key | yes | The partner key. |
| signature | yes | A signature for this call. |

The "queue user remove" method removes the user registration with this queue, such as where the queue owner is permitted to make this call. The HTTP Method is GET and the associated parameters are:

| Name | Required | Description |
| --- | --- | --- |
| Queue id | yes | The queue id |
| username | yes | The user's username |
| Key | yes | The partner key. |
| Signature | yes | A signature for this call. |

The "queue items" method is used to list items in the queue, such as when the parameter username is passed, to return items in the queue for this user, where registered users are permitted to make this call. The HTTP Method is GET and the associated parameters are:

| Name | Required | Description |
| --- | --- | --- |
| Queue id | yes | The queue id |
| username | no | The user's username |
| Start | no | The start index. |
| Count | no | The number of items to return from start index. |
| Key | yes | The partner key. |
| Signature | yes | A signature for this call. |

The "queue items history" method is used to list items in the queue history, such as when the parameter username is passed to return items in the queue history for this user, where registered users are permitted to make this call. The HTTP Method is GET and the associated parameters are:

| Name | Required | Description |
| --- | --- | --- |
| Queue id | yes | The queue id |
| username | no | The user's username |
| Start | no | The start index. |
| Count | no | The number of items to return from start index. |
| Key | yes | The partner key. |
| signature | yes | A signature for this call. |

The "queue items waiting" method provides a list of items in waiting queue, such as where every user has a separate waiting queue, and when the parameter username is passed it returns items in the waiting queue for this user, where registered users are permitted to make this call. The HTTP Method is GET and the associated parameters are:

| Name | Required | Description |
| --- | --- | --- |
| Queue id | yes | The queue id |
| username | no | The user's username |
| Start | no | The start index. |
| Count | no | The number of items to return from start index. |

-continued

| Name | Required | Description |
| --- | --- | --- |
| Key | yes | The partner key. |
| signature | yes | A signature for this call. |

The "queue items remove" method removes items in the queue for the current user. The HTTP Method is GET, and the associated parameters are:

| Name | Required | Description |
| --- | --- | --- |
| Queue id | yes | The queue id |
| Key | yes | The partner key. |
| signature | yes | A signature for this call. |

The "queue items waiting remove" method removes items in the waiting queue for the current user. The HTTP Method is GET, and the associated parameters are:

| Name | Required | Description |
| --- | --- | --- |
| Queue id | yes | The queue id |
| key | yes | The partner key. |
| signature | yes | A signature for this call. |

The "queue items all remove" method removes all items associated with the queue for the current user. The HTTP Method is GET and the associated parameters are:

| Name | Required | Description |
| --- | --- | --- |
| Queue id | yes | The queue id |
| Key | yes | The partner key. |
| signature | yes | A signature for this call. |

The "queue item head" method is used to obtain the head item of the queue, such as where registered users are permitted to make this call. The HTTP Method is GET, and the associated parameters are:

| Name | Required | Description |
| --- | --- | --- |
| Queue id | yes | The queue id |
| Key | yes | The partner key. |
| signature | yes | A signature for this call. |

The "queue item head update" method updates the head item of the queue, such as where registered users are permitted to make this call. The HTTP Method is GET, and the associated parameters are:

| Name | Required | Description |
| --- | --- | --- |
| Queue id | yes | The queue id |
| Status | no | The status of the head queue item. |
| progress | no | The progress of the head queue item. |
| Key | yes | The partner key. |
| signature | yes | A signature for this call. |

The "queue item head rate" method rates the head item of the queue, such as where registered users are permitted to make this call. The HTTP Method is GET and the associated parameters are:

| Name | Required | Description |
| --- | --- | --- |
| Queue id | yes | The queue id |
| Value | yes | The rating value. |
| Key | yes | The partner key. |
| signature | yes | A signature for this call. |

The "queue item enqueue" tries to add item to the queue. If the queue is full, it enqueues the item to the waiting queue, such as where registered users are permitted to make this call. The HTTP Method is GET and the associated parameters are:

| Name | Required | Description |
| --- | --- | --- |
| Queue id | yes | The queue id |
| resource | yes | The resource string. |
| key | yes | The partner key. |
| signature | yes | A signature for this call. |

The "queue item dequeue" method dequeues the head item from the queue, such as where the queue owner is permitted to make this call. The HTTP Method is GET and the associated parameters are:

| Name | Required | Description |
| --- | --- | --- |
| Queue id | yes | The queue id |
| Key | yes | The partner key. |
| signature | Yes | A signature for this call. |

The "queue item remove" method removes an item specified by queue item id, such as where the user who submitted the item or the queue owner makes the call. The HTTP Method is GET and the associated parameters are:

| Name | Required | Description |
| --- | --- | --- |
| Queue id | yes | The queue id |
| Key | yes | The partner key. |
| signature | yes | A signature for this call. |

Feedback API Methods.

Feedback API 106 tracks user actions. In addition to providing data for user analytics, it also provides the basis for user history and charts. The "track" method tracks a user action. If no user is passed the action is tracked anonymously, and the associated parameters include:

| Name | Required | Description |
| --- | --- | --- |
| action | yes | The action being tracked. |
| service | yes | The resource service. |
| type | yes | The resource type |
| id | no | The resource id. Required if name or filter are not set. |
| name | no | The resource name. Required if id or filter are not set. |
| filter | no | The resource filter. Required if id or name are not set. |
| Context type | no | The context type. |
| Context id | no | The context id. |
| Context name | no | The context name. |
| city | no | The city. |
| state | no | The state code. |
| cc | no | The country code. |

-continued

| Name | Required | Description |
| --- | --- | --- |
| country | no | The country name. |
| lat | no | The latitude. |
| long | no | The longitude. |
| key | yes | The partner key. |

The "history" method retrieves a user's history. Filters can be passed to focus the results. The parameters include:

| Name | Required | Description |
| --- | --- | --- |
| action | no | An action to filter on. |
| service | no | A service to filter on. |
| type | no | A type to filter on. |
| key | yes | The partner key. |
| signature | yes | A signature for this call. |

The "aggregate" method is a feedback aggregator with the following parameters:

| Name | Required | Description |
| --- | --- | --- |
| action | no | An action to aggregate by. |
| cc | no | Aggregate by country code. |
| state | no | Aggregate by state. |
| city | no | Aggregate by city. |
| start date | no | A start date, used for focusing the results. Required if end date is set. |
| end date | no | An end date, used for focusing the results. Required if start date is set. |
| start | no | The start index of the result. |
| count | no | The number of items to return for the result. |
| key | yes | The partner key. |

The "error add" method adds an error as a feedback, and has the following parameters:

| Name | Required | Description |
| --- | --- | --- |
| code | yes | Error code. |
| Name | yes | Error name. |
| Machine id | no | Device machine id. Can be anonymous |
| Message | no | Error message. |
| Trace back | no | Error traceback. |
| Key | yes | The partner key. |

The "error" method gets an error as specified by id, and has the following parameters:

| Name | Required | Description |
| --- | --- | --- |
| id | Yes | An action id. |
| key | Yes | The partner key. |

The "errors" method gets errors specified by different filters, and has the following parameters:

| Name | Required | Description |
| --- | --- | --- |
| Machine id | no | The machine id. |
| code | no | The error code. |
| name | no | The error name. |
| start | no | The start index of the result. Default is 0 |
| count | no | The number of items to return for the result. |

-continued

| Name | Required | Description |
|---|---|---|
| start date | no | Default is 10. A start date, used for focusing the results. Required if end date is set. |
| end date | no | An end date, used for focusing the results. Required if start date is set. |
| key | yes | The partner key. |

Device API Methods.

Device API 110 provides an interface for managing data related to devices, such as a speaker, cell phone, iPod or iPad. The "model add" method adds a device model, and includes the following parameters:

| Name | Required | Description |
|---|---|---|
| name | yes | Model name |
| platform | yes | Model platform software and hardware |
| Hardware version | yes | Model release hardware version |
| Software version | yes | Model release software version |
| Description | no | Model description |
| Release date | no | Model release date |

The "model" method gets model information specified by id, and has the following parameters:

| Name | Required | Description |
|---|---|---|
| Model id | Yes | Model id |

The "models" method gets all device models, and has the following parameters:

| Name | Required | Description |
|---|---|---|
| platform | no | Model platform |
| start | no | The start index. |
| count | no | The number of items to return from start index. |

The "model remove" method is used to remove a device specified by an id, and has the following parameters:

| Name | Required | Description |
|---|---|---|
| Model id | yes | Model id |

Update API Methods.

Update API 108 provides methods for checking if an update exists for any device or application, including the download URL to the update, if one exists. For example, iOS application updates would likely be downloaded via the Apple App Store, but Update API 108 can still be used to check if the update is available and provide the iTunes URL. It also provides a method for adding an update for a device or application. The "check" method is used to check for an update for a device or application. The HTTP Method used is GET, and the associated parameters are:

| Name | Required | Description |
|---|---|---|
| Model id | no | The device model id. |
| Model alias | no | The device model alias. |
| version | yes | The device or application software version. |
| key | yes | The partner key. |
| signature | yes | A signature for this call. |

Parameters for the "check" method by user device are:

| Name | Required | Description |
|---|---|---|
| Machine id | no | The machine id. |
| Model id | no | The device model id. |
| Key | yes | The partner key. |
| signature | yes | A signature for this call. |

Errors.

Predetermined error codes are returned by the web service for error response.

Errors related to the web service interface include:

| Name | Description |
|---|---|
| Mapping Error | The method or parameters cannot be recognized to create a valid request. |
| User Agent Error | Invalid user agent. |
| Secure Request Error | Request requires https. |
| Interface Error | The requested interface cannot be found. |
| Method Error | The method is not available for this API. |
| Service Not Found Error | The requested service cannot be found. |
| Type Error | The requested type is invalid. |
| Api Key Error | The web service key is inactive or invalid. |
| Partner Service Error | The service requested is inactive or not valid for this partner. |
| Signature Error | Signature validation failed. |
| Filter Error | The requested filter was not recognized. |
| Partner Not Found Error | The partner cannot be found. |

User Errors related to user account and services include:

| | |
|---|---|
| Auth Error | User authentication failed. |
| Session Error | Session validation failed. |
| Username Error | Username validation failed. |
| User Password Error | Password validation failed. |
| User Email Validation Error | Email validation failed. |
| User Exists Error | User exists, user creation failed. |
| User Not Found Error | User not found. |
| User Email Exists Error | User email exists. |
| User Password Reset Error | Password update is required. |
| User Update Error | An error occurred updating the user. |
| User Add Error | An error occurred adding the user. |
| User Service Not Found Error | The user has not registered this service. |
| User Device Error | The error related to user device. |

Errors related to request results include:

| | |
|---|---|
| Service Call Error | The service call failed. |
| No Results Error | No results found for service call. |
| Add Error | Failed to add item. |
| Remove Error | Failed to remove item. |
| Update Error | Failed to update item. |

Errors related to content services include:

| | |
|---|---|
| Content Service Error | General content service error. |
| Content Auth Error | General content service authentication error |
| Content Api Version Error | Content service API version error |
| Content Protocol Error | Error related to connection protocol |
| Content Method Error | Method is missing or invalid |
| Content Parameter Error | Parameter is missing or invalid |
| Content License Error | License is missing, invalid or expired |
| Content Partner Error | Content service partner related error |
| Content Max Limit Error | Maximum limit error |
| Content Min Limit Error | Minimum limit error |
| Content Ad Error | Ad related error |
| Content Server Sync Error | Server synchronization failed |
| Content Signature Error | Content service invalid signature |
| Content User Error | General content service user error |
| Content User Auth Error | Content service user authentication error. Invalid combination of username and password |
| Content User Authorization Error | Content service user authorization error |
| Content User Email Error | Error related to user email |
| Content Username Error | Content service username is not set or invalid. |
| Content Password Error | Content service password is not set or invalid. |
| Content User Not Found Error | Content service user is not found |
| Content User Exists Error | Content service user already exists |
| Content User Not Active Error | Content service user is not active |
| Content User Account Error | User account related parameters are invalid |
| Content Device Error | General content service device error |
| Content Device Model Exists Error | Device model already exists |
| Content Device Model Invalid Error | Device model is invalid |
| Content Device Disabled Error | Device is disabled |
| Content Device Not Found Error | Device is not found |
| Content Device Exists Error | Device already exists |
| Content Stream Error | General content service stream error |

In addition to the web service APIs, service specific APIs can also be used to provide optimized interface capability to specific services. Several exemplary service specific APIs are described below.

Service Alpha is a browser based application that supports Mac and PC computers and iPad devices.

The Service Alpha Service "content get" method tracks metadata specified by name, and the associated parameters include:

| Parameter | Value | Required | Description |
|---|---|---|---|
| service | Service Alpha | yes | The content service name |
| type | Track | yes | |
| name | track name | yes | The track name |
| key | partner key | yes | The partner key. |

The Service Alpha Service "content get" method tracks metadata specified by id, and the associated parameters include:

| Parameter | Value | Required | Description |
|---|---|---|---|
| service | Service Alpha | yes | The content service name |
| type | Track | yes | |
| id | track id | yes | The track id |
| key | partner key | yes | The partner key. |

The Service Alpha Service "content get track" method obtains a list of all tracks, and the associated parameters include:

| Parameter | Value | Required | Description |
|---|---|---|---|
| service | Service Alpha | yes | The content service name |
| type | track | yes | |
| start | | no | The start index. |
| count | | no | The number of items to return from start index. |
| key | partner key | yes | The partner key. |

The Service Alpha Service "content get album track" method obtains a list of tracks specified by album name, and the associated parameters include:

| Parameter | Value | Required | Description |
|---|---|---|---|
| service | Service Alpha | yes | The content service name |
| type | track | yes | |
| content type | album | yes | |
| context name | album name | yes | The album name |
| start | | no | The start index. |
| count | | no | The number of items to return from start index. |
| key | partner key | yes | The partner key. |

The Service Alpha Service "content get artist track" method obtains a list of tracks specified by artist name, and the associated parameters include:

| Parameter | Value | Required | Description |
|---|---|---|---|
| service | Service Alpha | yes | The content service name |
| type | track | yes | |
| context type | artist | yes | |
| context name | artist name | yes | The artist name |
| start | | no | The start index. |
| count | | no | The number of items to return from start index. |
| key | partner key | yes | The partner key. |

The Service Alpha Service "get genre track" method lists tracks specified by genre name, and the associated parameters include:

| Parameter | Value | Required | Description |
|---|---|---|---|
| service | Service Alpha | yes | The content service name |
| type | track | yes | |
| context | genre | yes | |

-continued

| Parameter | Value | Required | Description |
|---|---|---|---|
| type context name | genre name | yes | The genre name |
| start | | no | The start index. |
| count | | no | The number of items to return from start index. |
| key | partner key | yes | The partner key. |

The Service Alpha Service "get album" method obtains album metadata specified by name, and the associated parameters include:

| Parameter | Value | Required | Description |
|---|---|---|---|
| service | Service Alpha | yes | The content service name |
| type | album | yes | |
| name | album name | yes | The album name |
| key | partner key | yes | The partner key. |

The Service Alpha Service "get album track id" method obtains album metadata specified by track id, and the associated parameters include:

| Parameter | Value | Required | Description |
|---|---|---|---|
| service | Service Alpha | yes | The content service name |
| type | Album | yes | |
| context type | Track | yes | |
| cid | track id | yes | The track id |
| key | partner key | yes | The partner key. |

The Service Alpha Service "get album track name" method obtains a list of albums specified by track name, and the associated parameters include:

| Parameter | Value | Required | Description |
|---|---|---|---|
| service | Service Alpha | yes | The content service name |
| type | Album | yes | |
| context type | Track | yes | |
| context name | track name | yes | The track name |
| key | partner key | yes | The partner key. |

The Service Alpha Service "get artist albums" method obtains a list of albums specified by artist name, and the associated parameters include:

| Parameter | Value | Required | Description |
|---|---|---|---|
| service | Service Alpha | yes | The content service name |
| type | album | yes | |
| context type | artist | yes | |
| context name | artist name | yes | The artist name |
| start | | no | The start index. |
| count | | no | The number of items to return from start index. |
| key | partner key | yes | The partner key. |

The Service Alpha Service "get genre albums" method obtains a list of albums specified by genre name, and the associated parameters include:

| Parameter | Value | Required | Description |
|---|---|---|---|
| service | Service Alpha | yes | The content service name |
| type | album | yes | |
| context | genre | yes | |
| type | | | |
| context name | genre name | yes | The genre name |
| start | | no | The start index. |
| count | | no | The number of items to return from start index. |
| key | partner key | yes | The partner key. |

The Service Alpha Service "get artist" method obtains a list of artists, and the associated parameters include:

| Parameter | Value | Required | Description |
|---|---|---|---|
| service | Service Alpha | yes | The content service name |
| type | artist | yes | |
| start | | no | The start index. |
| count | | no | The number of items to return from start index. |
| key | partner key | yes | The partner key. |

The Service Alpha Service "get genre" method obtains a list of all genres, and the associated parameters include:

| Parameter | Value | Required | Description |
|---|---|---|---|
| service | Service Alpha | yes | The content service name |
| type | genre | yes | |
| start | | no | The start index. |
| count | | no | The number of items to return from start index. |
| key | partner key | yes | The partner key. |

In addition to these exemplary methods, other suitable methods can also or alternatively be used by applying the user API 116 methods, the content API 104 methods, the feedback API 106 methods, the update API 108 methods and the device API 110 methods described herein.

Service Beta methods include the "add Service Beta service" method uses the service username and service password parameters to add an existing account or anonymous account, and returns an updated user services list. The HTTP Method is POST, https is required, and the associated parameters include:

| Name | Required | Description |
|---|---|---|
| service | yes | The service to add. |
| oauth | yes | This parameter should be set to 1. |
| service username | no | The user's service username. |
| service password | no | The user's service password. |
| key | yes | The partner key. |
| sig | yes | A signature for this call. |

The Service Beta "get featured artists" method obtains a list of featured artists, and the associated parameters include:

| Parameter | Value | Required | Description |
|---|---|---|---|
| service | Service Beta | yes | The content service name |
| type | artist | yes | |
| filter | featured | yes | |
| start | | no | The start index. |
| count | | no | The number of items to return from start index. |
| key | partner key | yes | The partner key. |
| sig | call sig | yes | The call signature. |

The Service Beta "get artist station tracks" method obtains a list of station tracks specified by artist, and the associated parameters include:

| Parameter | Value | Required | Description |
|---|---|---|---|
| service | Service Beta | yes | The content service name |
| type | track | yes | |
| context type | artist | yes | |
| cid | artist id | yes | The artist id |
| start | | no | The start index. |
| count | | no | The number of items to return from start index. |
| key | partner key | yes | The partner key. |
| sig | call sig | yes | The call signature. |

The Service Beta "get current user station tracks" method obtains a list of station tracks specified by user, such as where user stations play similar tracks selected mostly from favorite tracks and artists and other personal data, and the associated parameters include:

| Parameter | Value | Required | Description |
|---|---|---|---|
| service | Service Beta | yes | The content service name |
| type | track | yes | |
| context type | user | yes | |
| start | | no | The start index. |
| count | | no | The number of items to return from start index. |
| key | partner key | yes | The partner key. |
| sig | call sig | yes | The call signature. |

The Service Beta "get personal station tracks" method obtains a list of personal station tracks specified by user, such as where the personal station is a station composed almost entirely of the user's favorite tracks, and the associated parameters include:

| Parameter | Value | Required | Description |
|---|---|---|---|
| service | Service Beta | yes | The content service name |
| type | track | yes | |
| context type | user | yes | |
| cid | user id | yes | The user id |
| filter | favorite | yes | |
| start | | no | The start index. |
| count | | no | The number of items to return from start index. |

| Parameter | Value | Required | Description |
|---|---|---|---|
| key | partner key | yes | The partner key. |
| sig | call sig | yes | The call signature. |

The Service Beta "get picked station tracks" method obtains a list of picked station tracks specified by station, such as where the picked station contains selected tracks, and the associated parameters include:

| Parameter | Value | Required | Description |
|---|---|---|---|
| service | Service Beta | yes | The content service name |
| type | track | yes | |
| context type | station | yes | |
| cid | station id | yes | The picked station id |
| filter | picks | yes | |
| start | | no | The start index. |
| count | | no | The number of items to return from start index. |
| key | partner key | yes | The partner key. |
| sig | call sig | yes | The call signature. |

In addition to these exemplary methods, other suitable methods can also or alternatively be used by applying the user API 116 methods, the content API 104 methods, the feedback API 106 methods, the update API 108 methods and the device API 110 methods described herein, and as shown above for other services.

Service Prime Content API methods include the "add Service Prime service" method, which adds a Service Prime service. On success, a user is returned with an updated user services list. Otherwise, an appropriate error is returned. The HTTP Method is POST, https is required, and the associated parameters include:

| Name | Required | Description |
|---|---|---|
| service | yes | The service to add. |
| service username | yes | The user's service username. |
| service password | yes | The user's service password. |
| key | yes | The partner key. |
| sig | yes | A signature for this call. |

The "Service Prime get station" method gets station metadata, and the associated parameters include:

| Parameter | Value | Required | Description |
|---|---|---|---|
| service | Service Prime | yes | The content service name |
| type | station | yes | |
| id | station id | yes | The station id |
| key | partner key | yes | The partner key. |
| sig | call sig | yes | The call signature. |

In addition to these exemplary methods, other suitable methods can also or alternatively be used by applying the user API 116 methods, the content API 104 methods, the feedback API 106 methods, the update API 108 methods and the device API 110 methods described herein, and as shown above for other services.

Service Gamma Content API methods include "add Service Gamma service," which adds a Service Gamma service.

On success, a URL is returned. Otherwise, an appropriate error is returned. The HTTP Method is POST, https is required, and the associated parameters include:

| Name | Required | Description |
| --- | --- | --- |
| service | yes | The service to add. |
| oauth | yes | This parameter should be set to 1. |
| key | yes | The partner key. |
| sig | yes | A signature for this call. |

The "Service Gamma get artist" method obtains a list of artists by id. The associated parameters include:

| Parameter | Value | Required | Description |
| --- | --- | --- | --- |
| service | Service Gamma | yes | The content service name |
| type | artist | yes | |
| id | artist id | yes | The artist id. |
| key | partner key | yes | The partner key. |

In addition to these exemplary methods, other suitable methods can also or alternatively be used by applying the user API 116 methods, the content API 104 methods, the feedback API 106 methods, the update API 108 methods and the device API 110 methods described herein, and as shown above for other services.

Service Delta Content API methods include the "add Service Delta service" method, which is used to add a Service Delta service. On success, a user is returned with an updated user services list. Otherwise, an appropriate error is returned. The HTTP Method is POST, https is required, and the associated parameters include:

| Name | Required | Description |
| --- | --- | --- |
| service | yes | The service to add. |
| service username | yes | The user's service username. |
| service password | yes | The user's service password. |
| key | yes | The partner key. |
| sig | yes | A signature for this call. |

The Service Delta "get artist by id" method obtains artist metadata specified by id, and the associated parameters include:

| Parameter | Value | Required | Description |
| --- | --- | --- | --- |
| service | Service Delta | yes | The content service name |
| type | artist | yes | |
| id | artist id | yes | The artist id |
| key | partner key | yes | The partner key. |

In addition to these exemplary methods, other suitable methods can also or alternatively be used by applying the user API 116 methods, the content API 104 methods, the feedback API 106 methods, the update API 108 methods and the device API 110 methods described herein, and as shown above for other services.

The Service Sigma Content API includes the "add Service Sigma service" method. On success, a user is returned with an updated user services list. Otherwise, an appropriate error is returned. The HTTP Method is POST, https is required, and the associated parameters include:

| Name | Required | Description |
| --- | --- | --- |
| service | yes | The service to add. |
| service username | yes | The user's service username. |
| service password | yes | The user's service password. |
| key | yes | The partner key. |
| sig | yes | A signature for this call. |

The Service Sigma "get artist" method obtains artist metadata with list of albums, and the associated parameters include:

| Parameter | Value | Required | Description |
| --- | --- | --- | --- |
| service | Service Sigma | yes | The content service name |
| type | artist | yes | |
| id | artist id | yes | The artist id |
| key | partner key | yes | The partner key. |

In addition to these exemplary methods, other suitable methods can also or alternatively be used by applying the user API 116 methods, the content API 104 methods, the feedback API 106 methods, the update API 108 methods and the device API 110 methods described herein, and as shown above for other services.

The Service Tau Content API includes the "add Service Tau service" method, which adds a Service Tau service. On success, a user is returned with an updated user services list. Otherwise, an appropriate error is returned. The HTTP Method is POST, https is required, and the associated parameters include:

| Name | Required | Description |
| --- | --- | --- |
| service | yes | The service to add. |
| service username | yes | The user's service username. |
| service password | yes | The user's service password. |
| key | yes | The partner key. |
| sig | yes | A signature for this call. |

The Service Tau "get root links" method is used to generate a user interface front end. It returns list of links which can be later used for other methods to browse down the tree retrieving links, stations and shows, and the associated parameters include:

| Parameter | Value | Required | Description |
| --- | --- | --- | --- |
| service | Service Tau | yes | The content service name |
| type | link | yes | |
| machine id | machine id | no | The machine id. |
| key | partner key | yes | The partner key. |

It should be emphasized that the above described embodiments are merely examples of possible implementations. Many variations and modifications may be made to the above described embodiments without departing from the principles of the present disclosure. All such modifications and variations are intended to be included herein within the scope of this disclosure and protected by the following claims.

What is claimed is:

1. An apparatus for consolidated data services comprising:
a content application programming interface (API) configured to provide content from each of a plurality of data services to each of a plurality of devices using one or more of a plurality of content API methods;

a user API configured to provide user identification for each of the plurality of devices using one or more of a plurality of user API methods, wherein each of the user API methods includes a required signature parameter;

a device API configured to provide a client system to one or more of the plurality of devices using one or more of a plurality of device API methods; and a web service consolidator coupled to the content API, the user API and the device API, and to the plurality of data services and the plurality of devices through a communications media.

2. The apparatus of claim 1 wherein the web service consolidator is configured to control interactions between the content API, the user API, the device API, the plurality of data services and the plurality of devices.

3. The apparatus of claim 1 wherein the content API methods each have one or more associated parameters and comprise one or more of a get method, a search method, an add method, an update method and a remove method.

4. The apparatus of claim 1 wherein the user API methods each have one or more associated parameters and comprise one or more of a get bookmark method, a get bookmarks method, an add bookmark method, a remove bookmark method, a remove bookmarks method, a get playlist method, a get playlists method, an add playlist method, a remove playlist method, a remove playlists method, an update playlist method, a get playlist resource method, an add playlist resource method, a remove playlist resource method, a register device method, a register devices method, a get device method, an update device method, an unregister device method and an unregister devices method.

5. The apparatus of claim 1 wherein the user API methods each have one or more associated parameters and comprise one or more of a register method, a login method, a logout method, an update password method, a reset password method, an exists method, a get session method, a create session method, a get service method, an add service method, an add content provider service method, a remove service method, a get share method, a get shares method, an add share method, a remove share method and a remove shares method.

6. The apparatus of claim 1 wherein the device API methods each have one or more associated parameters and comprise one or more of an add model method, a get model method, a get models method and a remove model method.

7. The apparatus of claim 1 wherein the user API methods each have one or more associated parameters and comprise one or more of a get all queues method, a register queue method, an update queue method, an unregister queue method, a get queue user method, a register queue user method, an update queue user method, an unregister queue user method, a get queue items method, a get history items method, a get waiting items method, a remove queue items method, a remove waiting items method, a remove all items method, a remove queue head item method, an update head item method, a rate head item method, an enqueue item method, a dequeue item method and a remove item method.

8. A method for providing consolidated data services comprising:

receiving a user logon request at a user API from a registered device having a device id parameter, a partner key parameter and a signature parameter using one or more user API methods, wherein the user logon request includes the partner key parameter and the signature parameter;

receiving a content service selection for one of a plurality of content services using a type parameter and a key parameter if the user logon request is accepted;

logging the registered device onto the selected content service using stored user logon data for the selected content service; and using a session method of the user API to retrieve a user session, the session method including a username parameter, an authorization token parameter, the partner key parameter and the signature parameter.

9. The method of claim 8 comprising, prior to receiving the user logon request, using a register method of the user API to register a device, the register method includes one or more of the username parameter, a password parameter, an email address parameter, a first name parameter, a last name parameter, the partner key parameter and the signature parameter.

10. The method of claim 8 comprising using an update method of the user API to update a user profile, the update method includes the partner key parameter and the signature parameter.

11. The method of claim 8 comprising using a password update method of the user API to update a user password, the password update method includes an authorization parameter, a new password parameter, the partner key parameter and the signature parameter.

12. The method of claim 8 comprising using a session add method of the user API to create a new user session, the session add method including the username parameter, an authorization parameter, the partner key parameter and the signature parameter.

13. The method of claim 8 comprising using a services method of the user API to retrieve user content services, the services method including the partner key parameter and the signature parameter.

14. The method of claim 8 comprising using a service add method of the user API to add a content provider service, the service add method including a service parameter, a service username parameter, a service password parameter, the partner key parameter and the signature parameter.

15. The method of claim 8 comprising using a share method of the user API to share resources with a second user, the share method including a bookmark share id parameter, the partner key parameter and the signature parameter.

16. The method of claim 8 comprising using a share add method of the user API to add bookmark share with a second user, the share add method including the username parameter, a user service parameter, a resource service parameter, a resource type parameter, the partner key parameter and the signature parameter.

17. The method of claim 8 comprising using a playlist resource add method of the user API to add a track resource to a playlist, the playlist resource add method including a playlist id parameter, a service parameter, a content type parameter, a content id parameter, a content name parameter, the partner key parameter and the signature parameter.

18. A method for providing consolidated data services comprising:

receiving a user logon request at a user API using one or more user API methods, wherein the user logon request includes a required partner key parameter and a required signature parameter;

determining whether required parameters are present in the user logon request;

determining whether a device associated with the user logon request is a registered device using a device method of the user API if the required parameters are present in the user logon request, wherein the device method includes a device id parameter, a partner key parameter and a signature parameter;

receiving a content service selection for one of a plurality of content services using a type parameter and a key parameter;
logging the user onto the selected content service using stored user logon data for the selected content service; and
using a share method of the user API to share resources with a second user, the share method including a bookmark share id parameter, the partner key parameter and the signature parameter.

19. The method of claim 18 comprising using a share add method of the user API to add a bookmark share with the second user, the share add method including a username parameter, a user service parameter, a resource service parameter, a resource type parameter, the partner key parameter and the signature parameter.

20. The method of claim 18 comprising using a session method of the user API to retrieve a user session, the session method including a username parameter, an authorization token parameter, the partner key parameter and the signature parameter.

* * * * *